Figure 1:
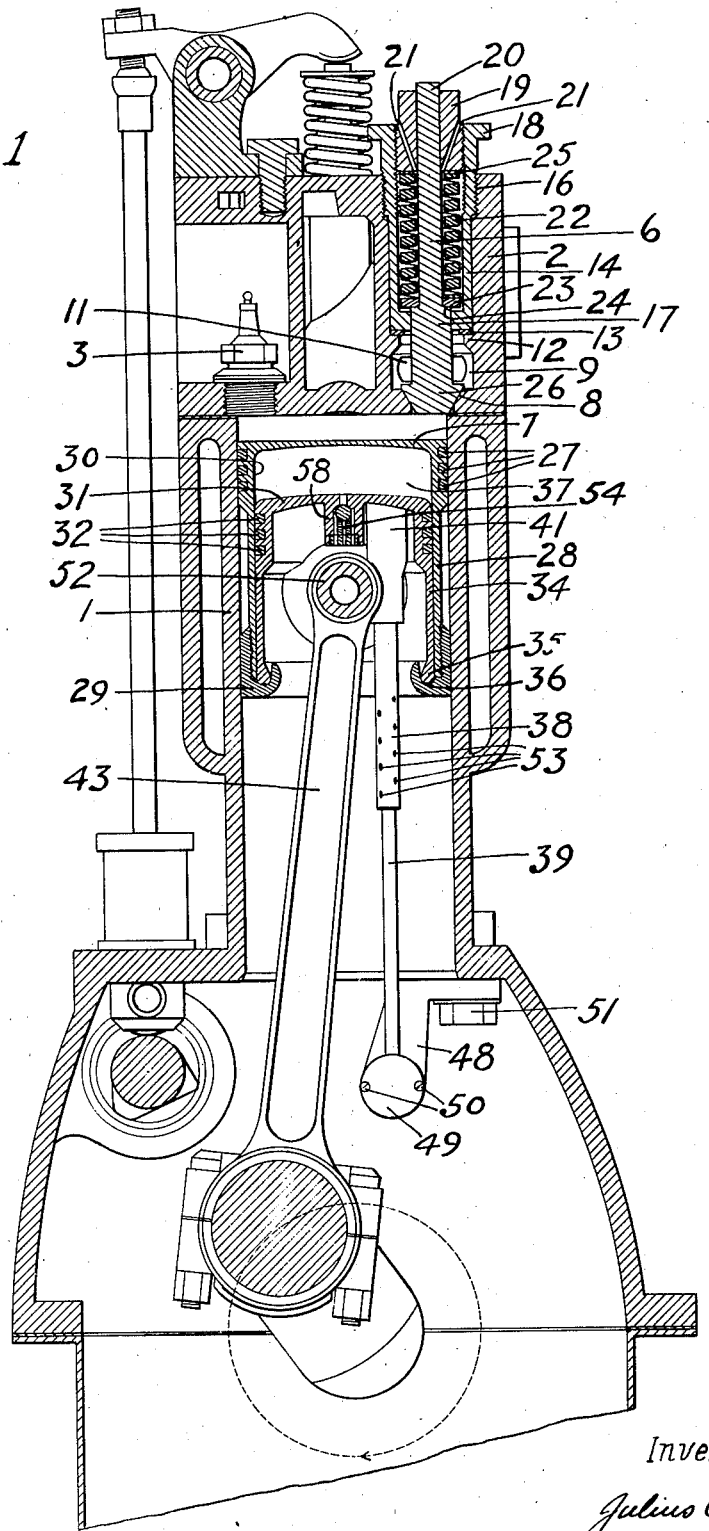

Sept. 12, 1933.         J. C. PETERSON            1,926,598
                    INTERNAL COMBUSTION ENGINE
                      Filed Aug. 1, 1928        2 Sheets-Sheet 1

Inventor:
Julius C. Peterson

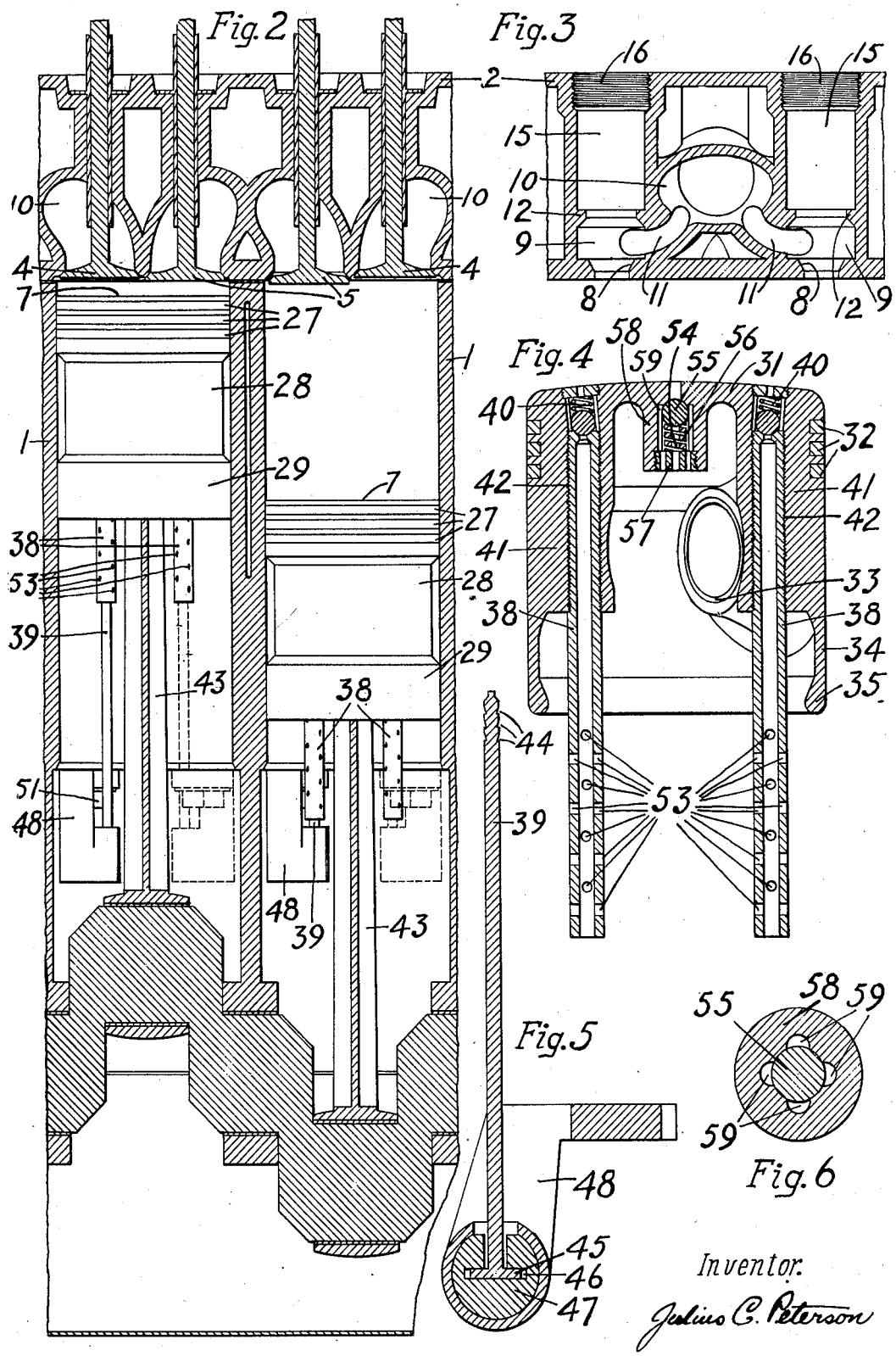

Patented Sept. 12, 1933

1,926,598

UNITED STATES PATENT OFFICE 1,926,598

INTERNAL COMBUSTION ENGINE

Julius C. Peterson, Chicago, Ill.

Application August 1, 1928. Serial No. 296,647

8 Claims. (Cl. 123—78)

My invention relates to internal combustion engines of the four stroke cycle type and the principal objects of my invention are: First, to provide means for practically complete expulsion of the products of combustion from the cylinder on the exhaust stroke; second, to provide means for maintaining the compression pressure, at the instant of ignition, practically constant for any degree of opening of the throttle and for any atmospheric pressure; third, to provide means for decreasing the shock to the bearings of the engine due to the explosion of the combustible mixture at the beginning of the power stroke; fourth, to provide means for decreasing the peak of the explosion pressure and increasing the average expansion pressure in the cylinder during the power stroke; and, fifth, to provide means for taking into the cylinder a greater amount of fuel mixture when the engine is operating at high speed and the throttle is wide open, than at low speed.

Further objects of my invention are to accomplish the foregoing objects in such a way that the usual construction of the engine will require very little modification, that no difficulties of manufacture shall be encountered, that no difficulties in the operation of the engine shall occur over the full range of its speed and load, and that no attention shall be required on the part of the operator.

Generally speaking, the ultimate objects of my invention are to increase the efficiency of the engine, which is to say, to get more power from an engine having cylinders of given dimensions and to decrease the amount of fuel consumption per horsepower hour, particularly when the engine is being operated at less than its full capacity; and to reduce vibration and to increase the durability of the engine.

Heretofore in internal combustion engines of the four stroke cycle type it has been usual to design the engine with a compression ratio such that the pressure under which the combustible mixture was compressed at the end of the compression stroke, was the maximum pressure that could be used without experiencing detonation or preignition, with the throttle wide open. The compression ratio is usually understood to be the ratio between the total volume of the cylinder when the piston is at its lowest point, and the volume of the cylinder when the piston is at its highest point on the compression stroke, the latter volume usually being termed the compression space, and the portion of the cylinder enclosing it being termed the compression chamber.

Of course the compression ratio is of importance only in so far as it is indicative of the compression pressure. As the total volume of the cylinder and the volume of the compression chamber remain constant, the compression ratio remains constant. But the compression pressure varies with the temperature of the gas and its initial pressure at the beginning of the compression stroke. This latter pressure varies with the amount that the throttle is open, being less when the throttle is partially open than when it is wide open. Consequently the compression pressure is less when the throttle is partially open than it is when the throttle is wide open.

At the end of the exhaust stroke the compression chamber remains filled with burned gas, usually termed the residual burned gas. This gas, at the beginning of the intake stroke, is usually under a pressure somewhat greater than atmospheric pressure. As the fuel mixture will not enter the cylinder until the pressure within the cylinder is lower than atmospheric pressure, except when a supercharger is used, the residual burned gas must expand as the piston descends, until the pressure within the cylinder becomes sufficiently low to cause the fuel mixture to enter. Consequently the combustible mixture in the cylinder at the end of the intake stroke contains an amount of residual burned gas somewhat greater in volume than the volume of the compression chamber. When the throttle is partly closed the pressure within the cylinder, during the intake stroke, is less than when the throttle is wide open, the expansion of the residual burned gas is greater, the amount of fuel mixture entering the cylinder is less, and the percentage of residual burned gas in the combustible mixture, at the end of the intake stroke, is higher than when the throttle is wide open.

The residual burned gas cannot be burned again, and its presence makes the combustible mixture less inflammable, so that more fuel must be used in the mixture in order to cause ignition and combustion than would be the case if the combustible mixture contained no residual burned gas.

Experience shows that, as a consequence of these two factors, that is, reduced compression pressure and a larger percentage of residual burned gas in the combustible mixture, the consumption of fuel per horsepower hour may be fifty per cent greater for the operation of the engine with the throttle nearly closed than it is for its operation with the throttle wide open.

It becomes obvious, then, that if the residual burned gas be greatly reduced in volume, less fuel will be needed in the combustible mixture to insure ignition and combustion, and that if the compression pressure be kept at the same maximum, regardless of whether the throttle is wide open or partially closed, less fuel will be needed to produce the same amount of power when the throttle is partially closed.

My invention accomplishes these results, causing practically all the burned gas to be expelled from the cylinder on the exhaust stroke and maintaining practically the same compression pressure at the instant of ignition for all positions of the throttle.

Heretofore in internal combustion engines of the four stroke cycle type, the piston has been usually connected to the crankshaft by a connecting rod in such a way that the distance from the head of the piston to the center of the upper connecting rod bearing has been constant. In my invention the distance from the head of the piston to the center of the upper connecting rod bearing is variable, so that the length of the path travelled by the piston head need not be equal to the length of the path travelled by the upper end of the connecting rod. The cylinder, including the compression chamber, is of uniform diameter throughout its length, thus permitting the piston head to enter the compression chamber. The closure of the upper end of the cylinder is such that when the piston reaches its highest point on the exhaust stroke, the closure is substantially parallel to the piston head. By causing the piston head to approach the cylinder closure as nearly as the necessities of mechanical clearance will permit, at the end of the exhaust stroke, the compression chamber is cleared of burned gas except for the small amount remaining due to the clearance and to the recesses necessary for the placement of the valves and spark plug.

Some of the objects of my invention are; to reduce the formation of carbon within the cylinder; to make possible the use of a leaner mixture of fuel; to reduce the heat in the engine by the complete elimination of the residual burnt gases; to make possible the use of a higher compression pressure; to obtain as near as possible a constant compression pressure during all conditions of engine operation; to reduce vibration in the motor; to relieve the engine bearings of excessive shock; and to increase generally the efficiency of the motor.

Consequently, while the accompanying drawings show one form that my invention may take, they are in the main illustrative, for other forms, coming within the scope of my invention, are practical and I do not limit my invention to what is shown in the drawings.

Figure 1 is a vertical section through the engine, on a plane containing the longitudinal axis of one of the cylinders and perpendicular to the axis of the crankshaft, showing the parts of the piston in the positions they take when the compression stroke is nearly completed, the engine being run with the throttle nearly closed. Figure 2 is a vertical section of part of the engine, on a plane containing the longitudinal axes of the cylinders and crankshaft, showing two cylinders, the two pistons not in section; the piston at the left being at its highest point on the compression stroke, the piston at the right being at its lowest point on the intake stroke, the engine being run with the throttle nearly closed. Figure 3 is a vertical section of part of the cylinder head, on a plane containing the axes of the wells in which the relief valves are positioned, showing the passages connecting the relief valve chambers with the exhaust passages. Figure 4 is a vertical section through the center of the inner piston, on a plane containing the longitudinal axes of the air pumps. Figure 5 is a vertical section of one of the air pump plungers and the support for the lower end of the plunger, on a plane containing the axis of the air pump plunger, parallel to the plane of Figure 1. Figure 6 is a horizontal section through the air chamber relief valve, on a plane through the center of the ball in the valve.

Each cylinder 1 has a cylindrical bore of uniform diameter throughout its length.

The cylinder head 2, with the spark plug 3, the exhaust valve 4, the intake valve 5, and the cylinder relief valve 6, forms a closure for each cylinder, the closure being such that it is substantially parallel to the head 7 of the outer piston when the latter reaches its highest position on the exhaust stroke. In my Patent No. 1,850,474, issued March 22, 1932, I have shown and described cylinders and a cylinder head similar to those shown herein, except that in the case of the cylinder head one of the two spark plugs for each cylinder has been replaced by the cylinder relief valve 6, hence only a description of the relief valve is given in this application.

The valve seat 8 has a conical surface with the smaller perimeter toward the interior of the cylinder. Above the valve seat is the valve chamber 9 which is connected with the exhaust passage 10 by the passage 11, providing a path from the interior of the cylinder to the exhaust manifold (not shown) for any part of the contents of the cylinder whenever the relief valve is open. The shoulder 12, with the washer 13, makes a gas tight joint when the valve cage 14 is inserted into the well 15 and is screwed down by means of the female screw threads 16 in the top of the well, and the male screw threads on the outer surface of the valve cage. The valve cage is substantially cylindrical in shape, with its lower end closed except for a hole in the center which forms a bearing in which the lower end 17 of the valve stem slides as the valve opens and closes. The upper end of the valve cage has a nut 18 formed on its outer portion, so that a wrench may be used in screwing it into place.

Female screw threads in the upper end of the valve cage cooperate with male screw threads on the adjusting plug 19, which has a nut formed on its upper end and a cylindrical hole through its center which forms a bearing in which the upper end 20 of the valve stem slides as the valve opens and closes. Holes 21 in the plug 19 permit air or gas to escape from the interior of the valve cage. The bottom of the compression spring 22 bears against the washer 23 which is seated on the shoulder 24 of the valve stem. The top of the compression spring bears against the washer 25, which is held in place by the plug 19. The valve head 26 has a conical surface to fit the valve seat 8 and forms therewith a gas tight joint. The inclination of the conical surfaces of the valve head and valve seat, to their axes, is preferably about 30 degrees, which facilitates the easy closing of the valve by the spring 22. The lower surface of the valve head lies substantially in the plane of the lower surface of the cylinder head. When the pressure in the cylinder rises high enough, it opens the valve by forcing the valve head upward against the pressure of the spring, which keeps the valve closed when the pressure in the cylinder is lower. By screwing the plug 19 up or down the compression of the spring 22 may be adjusted so that the valve will be opened at approximately any predetermined pressure in the cylinder, and will be closed as the pressure is reduced by the escape of part of the contents of the cylinder through the valve.

This construction permits the relief valve to be assembled as a unit prior to its insertion in the cylinder head, and also permits the removal of the valve from the cylinder head without disturbing the adjustment of the valve, features of value in the construction and repair of the engine.

The outer piston has the usual piston rings 27 positioned in piston ring grooves, and the skirt 28 which has a male screw thread cut in its outer surface near the bottom. The retaining ring 29 has a female screw thread to fit the male screw thread on the piston skirt, so that the retaining ring may be screwed on to the lower end of the skirt. The outer piston has the inner cylindrical bore 30, concentric with the outer cylindrical surfaces of the outer piston. The lower surface of the piston head 7 is concave and substantially of the same curvature as the convex upper surface of the head 31 of the inner piston. The inner piston has a cylindrical outer surface to fit the bore of the outer piston, piston rings 32 of the usual form, positioned in piston ring grooves, and bearings for a piston pin with the bushings 33 positioned therein. The lower edge of the skirt 34 of the inner piston is enlarged to form the ring 35. The lower portion of ring 35 is convex and substantially semi-circular in cross section, except for a slight flattening at the bottom. The bottom of the groove 36 formed in the retaining ring 29, fits the bottom of the ring 35 with a slight clearance. The groove and ring form a dashpot to absorb the shock of stopping the upward motion of the outer piston relative to the inner piston, when the outer piston approaches the limit of this relative motion. This dashpot is similar to the dashpot shown and described in my Patent No. 1,850,474.

The upper end of the interior of the outer piston is closed by the head 31 of the inner piston, forming the air chamber 37. Air is continually supplied to the air chamber, when the engine is running, by two air pumps, having the cylinders 38, the plungers 39, and the valves 40, which permit air to enter the air chamber from the air pumps, but prevent its exit.

The inner piston casting is formed with the integral portions 41, suitable to receive the pump valves 40 and the upper ends of the pump cylinders 38, which are held firmly in position by the screw threads 42. The pump cylinders are of the same size and are symmetrically positioned diametrically opposite each other so that the center of gravity of the inner piston will be at a point on the vertical axis of the piston. The pump cylinders are far enough away from the center of the piston so as not to interfere with the motion of the connecting rod 43, and far enough away from the circumference of the piston so as not to touch the retaining ring 29. The pump plunger 39 is cylindrical in shape and of such diameter as to form a sliding fit with the bore of the cylinder 38. Shallow circumferential grooves 44 are formed in the upper end of the plunger, the lower sides of the grooves being perpendicular to the axis of the plunger and the upper sides of the grooves being inclined to the axis, so that oil in the grooves will form a seal between the plunger and the bore of the pump cylinder on the compression stroke of the pump. Formed integral with the lower end of the pump plunger is the flat button 45, which is positioned in the slot 46, formed to receive it, in the cylinder 47. The bracket 48 has a cylindrical bearing to receive the cylinder 47 so that the latter may rotate therein. The plate 49, held in position by the screws 50, retains the cylinder 47 in its bearing. The bracket 48 is attached in a fixed position to the crank case by the bolt 51. The slot 46 is of such size and form as to permit the lower end of the plunger to move slightly in any direction perpendicular to the longitudinal axis of the plunger, and to prevent any appreciable motion of the plunger in the direction of its axis. This construction is shown in Figure 5.

The inner piston is attached to the upper end of the connecting rod 43 by the piston pin 52 and hence moves vertically up and down. Due to necessary clearance between the bore of the cylinder 1 and the outer surface of the outer piston, and to clearance between the bore of the outer piston and the outer surface of the inner piston, the motion of the inner piston varies slightly from a straight line. The inner piston may also have a slight motion of rotation about a horizontal axis. The motion of the pump cylinder 38 must conform to the motion of the inner piston, and the slight motion provided for the lower end of the pump plunger permits the plunger to conform to the motion of the pump cylinder and thus prevent undue friction or binding.

As the inner piston ascends some of the holes 53 in the lower end of the pump cylinder are carried above the upper end of the pump plunger and air enters the bore of the cylinder through the holes. As the piston descends the holes 53 pass the top of the pump plunger and the air remaining in the cylinder is compressed in the upper end of the cylinder, the ball in the pump valve 40 is pushed upward by the pressure of the compressed air in the cylinder and the air enters the air chamber 37 through the valve, which closes as the piston starts to ascend again.

If the bore of the cylinder 1 is lubricated by oil spray contained in the crank case air, as is usual in most engines, some of this oil spray will be drawn into the pump cylinder and will lubricate it, and part of the oil will collect in the plunger grooves 44 and form the air seal. Part of the oil spray entering the pump cylinder will be forced into the air chamber 37, where it will lubricate the inner bore of the outer piston, the outer cylindrical surfaces of the inner piston and the piston rings 32, and will form the air seal between the outer and inner pistons.

Excess oil in the air chamber will be forced down between the outer and inner pistons by the air pressure in the air chamber, collecting in the groove 36 of the dashpot.

In order that some of the air in the air chamber may escape when the pressure in the chamber gets too high, the air chamber relief valve 54 is provided. This is also a ball valve, which opens when the pressure reaches a predetermined value. The ball 55 is held in its seat by the compression spring 56. The upper end of the spring rests against the ball and the lower end against the perforated plug 57 which is screwed into the lower end of the housing 58, cast integral with the piston. The valve will open when the pressure in the air chamber becomes high enough to force the ball down against the pressure of the spring, and will close when the pressure in the air chamber is reduced by the escape of part of the air from the air chamber through the valve. The air passages 59, in the sides of the cylindrical chamber in which the ball is positioned, permit the air to pass when the ball descends.

As any suitable valve gear, ignition system, lubrication system, and so on may be used in the engine, the presence of all parts not particularly mentioned is assumed.

In such a system as that described, where a cylinder contains a piston comprising two parts capable of limited relative sliding motion, connected by a connecting rod to the crank pin of a revolving crankshaft, the motion of the inner piston, being connected to the upper end of the connecting rod, is practically in a straight line, with a velocity varying from zero at the moments when the crank pin is at the top and bottom of the crank pin circle, to a maximum slightly in excess of the linear speed of the crank pin at the two moments when the axis of the connecting rod is tangent to the crank pin circle.

For a connecting rod whose length is two and a half times the diameter of the crank pin circle, the two points of tangency of the axis of the connecting rod to the circle are each approximately seventy-nine degrees from the top of the crank pin circle. For convenience I will divide each stroke of the inner piston into two parts, calling the part during which the crank pin travels between the bottom of the crank pin circle and a point of tangency, the lower part; and the remaining part, during which the crank pin travels between a point of tangency and the top of the crank pin circle, the upper part.

During the lower part of an upward stroke and the upper part of a downward stroke, the inner piston, when the engine is running at a uniform speed, moves with a continually increasing velocity. During the upper part of an upward stroke and the lower part of a downward stroke, the inner piston moves with a continually decreasing velocity.

While the motion of the outer piston conforms largely to that of the inner piston, and at times is identical with it, in general it differs by having at times a higher velocity, at other times a lower velocity, and by having a path of variable length. The motion of the outer piston is affected by friction, by gravity, by its inertia and momentum, by the pressure of the contents of the cylinder, by the pressure of the air in the air chamber, by the action of the dashpot and by direct contact with the inner piston when the dashpot is closed. In an engine which is run at varying speeds and with varying loads, some of these factors vary within wide limits and their effect will be considered during a complete cycle of the engine's operation.

Assuming that the engine is running at an average rate of speed and that the air chamber contains air, I will start with the exhaust stroke following a power stroke. The position of the outer piston head will be assumed as about midway between its limits of motion relative to the inner piston, the dashpot being open. During the lower part of the exhaust stroke the motion of the outer piston upward is opposed by the pressure of the exhaust gas in the cylinder, by gravity, by friction with the cylinder walls and by its inertia, while friction with the inner piston and the pressure of the air in the air chamber act to cause the outer piston to move upward. When the air pressure in the air chamber becomes sufficiently great, due to the decrease in size of the air chamber caused by the inner piston moving upward, the opposing forces are overcome and the outer piston then moves upward at approximately the same velocity as the inner piston. During the upper part of the exhaust stroke the motion upward of the outer piston is retarded by the same forces as in the lower part of the stroke, with the exception of its inertia. Friction with the inner piston is now a retarding factor, but the momentum of the outer piston and the pressure of the air in the air chamber are sufficient to overcome the retarding forces. The outer piston ascends until the dashpot starts to close and in closing absorbs the momentum which was not used up in overcoming the retarding forces, and brings the outer piston to rest at approximately the same time that the inner piston comes to rest.

As will be shown later, the pressure in the air chamber varies with the setting of the throttle, being greater as the throttle is closed and less as the throttle is opened. In general, the speed of the engine is greater as the throttle is opened and less as the throttle is closed. The momentum of the outer piston is greater as the speed increases and less as the speed decreases.

To some extent, then, the air pressure in the air chamber and the momentum of the outer piston supplement each other during the upper part of the exhaust stroke and reduce the amount of variation in their resultant, which is the factor causing the upward motion of the outer piston. Consequently the outer piston will ascend to its limit of motion upward due to air pressure in the air chamber when its momentum is not sufficiently great to accomplish the movement, as may be the case at very low engine speeds.

In the case of engines having a wide range of speed, when the engine is running at its highest speed the momentum of the outer piston is relatively very great, and the dashpot must, of course, be designed to absorb the maximum amount of excess momentum at this speed. In consequence the momentum at lower engine speeds may not be sufficient to cause the dashpot to entirely close, and the head of the outer piston would then not quite reach its highest position. But the distance by which it failed to reach its highest position would be very small, and in general the head of the outer piston, at the end of the exhaust stroke, will be so close to the cylinder closure that practically all of the exhaust gas will be expelled from the cylinder and the amount of residual burned gas remaining in the clearance volume will be very small.

The oil necessary for the operation of the dashpot is supplied to the groove forming its lower member by the oil spray in the air of the crank case and by the oil on the inner surface of the outer piston being pushed into the groove by the ring forming the upper member of the dashpot. As the dashpot is open during the power stroke and ordinarily is required to function only on the exhaust stroke, sufficient oil will thus be supplied.

At the start of the intake stroke, then, the outer piston is at or very near its highest limit of motion. During the upper part of the stroke, the dashpot being closed or very nearly closed, the inner piston pulls down the outer piston with it. During the lower part of the stroke, friction of the outer piston with the cylinder walls and with the inner piston, the pressure of the air in the crank case against the retaining ring and the pressure of the air in the air chamber oppose the downward motion of the outer piston, while its momentum and gravity act to cause it to descend. The momentum not used up in overcoming the opposition of the other factors must be absorbed by the increase of pressure in the air chamber. Since this pressure is less when the throttle is open, and since the momentum of the outer piston is greater when the speed of the engine is high, the outer piston will travel farther downward, before its momentum is absorbed, when the engine speed is high and the throttle open, thus drawing in larger charges of fuel mixture. Conversely, as the throttle is closed and as the speed of the engine decreases, the charges of fuel mixture drawn into the cylinder become smaller. Thus economy of operation and an increased power range are accomplished by my invention.

At the start of the compression stroke the conditions are very similar to those at the start of the exhaust stroke, the only practical difference being that the pressure in the cylinder is somewhat less, the pressure in the air chamber is somewhat less, and the position of the outer piston relative to the inner piston, is slightly higher. During the lower part of the stroke, then, as the air pressure in the air chamber increases due to the decrease in volume of the air chamber caused by the upward movement of the inner piston, practically the same opposing forces are overcome as on the exhaust stroke and the outer piston moves upward.

After the intake valve closes, the pressure of the combustible mixture in the cylinder rises as the outer piston moves upward. During the upper part of the stroke, the momentum of the outer piston and the pressure in the air chamber cause the outer piston to ascend until the opposing forces of gravity, friction, and the increasing pressure in the cylinder, have absorbed most of the momentum of the outer piston. As the inner piston comes to rest, equilibrium is established between the forces of gravity and pressure in the cylinder, acting to move the outer piston downward, and the force of the pressure in the air chamber, acting to move the piston upward. As a result, the total pressure in the air chamber acting upward on the outer piston head, is slightly greater than the total pressure in the cylinder acting downward on the outer piston head, and the outer piston comes to rest. The unit compression pressure in the cylinder, then, at the end of the compression stroke, has a direct relation to the unit pressure in the air chamber, being in inverse ratio of the effective areas of the upper and lower surfaces of the outer piston head, if the effects of gravity and the pressure of the air in the crank case on the effective area of the retaining ring are omitted. If the ratio of the effective area of the upper surface of the outer piston head to the effective area of the upper surface of the inner piston head, is as four to three, as it would be approximately, then the unit pressure in the cylinder will be three fourths of the unit pressure in the air chamber. It is evident that, if the pressure in the air chamber is so regulated that it will have a constant value when the outer piston comes to rest at the end of the compression stroke, the compression pressure in the cylinder will also have a constant value at the end of the stroke.

By varying the density of the air in the air chamber by pumping more air into the air chamber, the outer piston head will ascend higher at the end of the compression stroke, since the volume of the air in the air chamber will be decreased less before the constant unit pressure is reached; and when the density of the air in the air chamber is decreased by letting some of the air escape from the air chamber, the outer piston head will not ascend as high at the end of the compression stroke, since the volume of the air chamber will be decreased more before the constant unit pressure is reached. The varying density of the combustible mixture in the cylinder, at the beginning of the compression stroke, due to variable settings of the throttle and to variable degrees of atmospheric pressure, becomes constant at the end of the compression stroke by thus varying the volume of the compression chamber in which the combustible mixture is compressed. However, the compression pressure is of importance mainly as an index of what occurs during the power stroke, and if the control of events during the power stroke is such as to attain the desired results, the compression pressure at the end of the compression stroke may be left to look after itself.

At the start of the power stroke, the ignition of the combustible mixture usually occurs at, or slightly before, the moment of maximum compression pressure, and combustion occupies the extremely short period while the crank pin is crossing dead center. The length of time required for combustion depends on how well the mixture is ignited and on the compression pressure. Thorough ignition and high compression pressure shorten the period of combustion and increase the peak explosion pressure and the average expansion pressure during the power stroke. The latter is desirable and the former undesirable, for high pressure at dead center does no work, causes vibration, and injures the bearings.

In my invention, since the outer piston head may move downward independently of the inner piston, the blow caused by the peak explosion pressure is reduced in two ways. First, part of the force of the explosion is absorbed by the inertia of the outer piston, which is started downward against the pressure of the air in the air chamber. Second, the volume of the explosion chamber is increased by the downward motion of the outer piston, permitting the burning gas to expand and thus reducing the peak explosion pressure. Higher compression pressure may be used without subjecting the engine bearings to the blows which cause their rapid deterioration.

The combustion of the combustible mixture occupies too short a time for the outer piston to move more than a very short distance, and so the peak explosion pressure in the cylinder is not reduced very much, but during that time and the time following while the outer piston continues to move downward faster than the inner piston moves, the crank pin has moved past dead center. When the peak pressure in the air chamber occurs, the inner piston has started downward. The peak pressure on the inner piston head is reduced and comes at a time when the pressure can perform work by moving the inner piston. The practical effect is to delay the action of the peak explosion pressure on the inner piston until the crank pin has passed dead center, so that the pressure which in engines heretofore did practically no work due to the crank pin being on or very near dead center, now does work because the crank pin has passed dead center. The delay in the action of the peak explosion pressure on the inner piston increases as the throttle is closed, since the outer piston has to move downward farther before the peak pressure in the air chamber occurs, so that the power at the lower speeds is increased still further over that possible heretofore.

As the outer piston descends due to the pressure in the cylinder, the gas in the cylinder expands and the expansion pressure falls. As the pressure in the cylinder falls the pressure in the air chamber must also fall and the volume of the air chamber must increase, so that the outer piston moves upward relative to the inner piston. That is, the velocity of the outer piston, which was greater at the start of the power stroke, is less than that of the inner piston during the greater part of the stroke. The volume of the cylinder thus increases more slowly and the expansion pressure falls more slowly. The effective pressure on the inner piston is thus kept higher throughout the power stroke. The amount of work done by the gas pressure is therefore greater and the efficiency of the engine is further increased.

The forces of gravity, friction, momentum of the outer piston, and the pressure of the air in the crank case, during the power stroke, affect the motion of the outer piston in a manner similar to that on the intake stroke.

Other things being equal, the peak explosion pressure is dependent on the compression pressure at the instant ignition takes place. The air chamber relief valve is set to open for a pressure in the air chamber corresponding to that desired for the peak explosion pressure in the cylinder, that is, for a unit pressure approximately one third greater than the unit peak explosion pressure. Air is being continually pumped into the air chamber by the air pumps, and, when the engine is running at a uniform speed, a little of this air must escape through the air chamber relief valve, which it does when the pressure gets to the point for which the valve is set. Thus the peak explosion pressure and the maximum compression pressure both remain at practically constant values.

As the throttle is closed or as the atmospheric pressure decreases, the maximum compression pressure becomes less than normal, the peak explosion pressure is also less than normal, and no air escapes from the air chamber through the air chamber relief valve. The pressure in the air chamber thus continues to rise until the peak explosion pressure and maximum compression pressure are again normal. As the throttle is opened or as the atmospheric pressure increases, the maximum compression pressure becomes greater than normal, the peak explosion pressure is also greater than normal, and air escapes from the air chamber through the air chamber relief valve until the pressures are again normal. Thus, no matter what the density of the combustible mixture may be at the start of the compression stroke, the maximum compression pressure and the peak explosion pressure remain at practically constant values.

To provide for the case where the throttle is suddenly opened wide from a nearly closed position, which would cause abnormally high compression and peak explosion pressure, the cylinder relief valve in the cylinder head is set to open for a pressure slightly in excess of the normal peak explosion pressure. The escape of gas from the cylinder through this valve prevents the peak explosion pressure from rising much above normal and also prevents excessive pressure from driving too much air out of the air chamber through the air chamber relief valve. In a few strokes of the piston the pressures become normal again through the escape of the required amount of air through the air chamber relief valve.

The functioning of my invention is thus seen to be positive and entirely automatic, requiring no attention whatever from the engine operator.

I claim:

1. A piston for a constant compression internal combustion engine comprising, in combination, an inner piston member, an outer piston member movable relative to the inner member and constituting the effective head for the piston, said members having an air chamber formed between their heads, means for supplying compressed air to said chamber, the said means comprising a pump cylinder secured to the inner piston member and having air intake ports therein, and a pump plunger adapted to reciprocate therein to intermittently cover and uncover said air intake ports, and a relief valve for said air chamber.

2. A piston for a constant compression internal combustion engine comprising, in combination, an outer piston member, an inner piston member completely encased within said outer member and adapted to reciprocate therein, said outer and inner piston members forming an air chamber between the heads of said members, means for supplying compressed air to the air chamber, and a relief valve for said air chamber.

3. A piston for a constant compression internal combustion engine comprising, in combination, a hollow cylindrical piston member, a second cylindrical piston member mounted within said first named piston and adapted to bear against the inner wall of the first named piston member, said piston members forming an air chamber between the heads thereof, means for supplying air to said air chamber, and a relief valve to relieve excessive pressure within the chamber.

4. A constant compression internal combustion engine comprising, in combination, a cylinder, a cylinder head, a piston within said cylinder, said piston comprising components movable relative to each other to vary the effective length of the piston stroke, and a valve in said cylinder head to relieve the compression chamber of excessive pressure.

5. A piston for a constant compression internal combustion engine comprising in combination, an inner piston member, an outer piston member enclosing the first named piston member and capable of longitudinal movement relative thereto, said piston members having an air chamber formed between the heads of the said members for cushioning the downward movement of the outer member relative to the inner member, a dash pot for limiting the downward movement of the inner member relative to the outer member, and a relief valve for said air chamber.

6. A piston for a constant compression internal combustion engine comprising in combination inner and outer piston members movable relative to each other and arranged to form an air chamber between the heads thereof said outer member constituting the effective head of the piston, means for supplying air under pressure to said air chamber including a plurality of air pumps carried by the inner member and arranged symmetrically to the longitudinal axis of the said piston members, and a relief valve for said air chamber.

7. A piston for a constant compression internal combustion engine comprising, in combination, an outer piston member, an inner piston member completely encased within said outer member and adapted to reciprocate therein, said outer and inner piston members forming an air chamber between the heads of said members, means for supplying compressed air to the air chamber, a relief valve for said air chamber, and a dash pot for limiting the upward movement of the outer member relative to the inner member.

8. In a constant compression engine, the combination therewith of inner and outer piston members having an air chamber intermediate their heads, and a pump for supplying air to said chamber, said pump comprising a pump cylinder depending from the inner piston member and having intake ports in its side, and a pump plunger fixed to the frame of the motor and adapted to reciprocate within the pump cylinder to intermittently cover and uncover said air intake ports.

JULIUS C. PETERSON.